(12) United States Patent
Subramanian et al.

(10) Patent No.: US 11,388,060 B1
(45) Date of Patent: Jul. 12, 2022

(54) SYSTEMS AND METHODS FOR DISCOVERY AND CONFIGURATION OF A NETWORK DEVICE

(71) Applicant: Xilinx, Inc., San Jose, CA (US)

(72) Inventors: Ramesh R. Subramanian, Hyderabad (IN); Jayaram Pvss, Hyderabad (IN); Syed S. Khader, Hyderabad (IN)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 16/697,144

(22) Filed: Nov. 26, 2019

(51) Int. Cl.
| | |
|---|---|
| *G06F 15/16* | (2006.01) |
| *H04L 41/12* | (2022.01) |
| *H04L 41/0213* | (2022.01) |
| *G06F 13/28* | (2006.01) |
| *H04L 41/0803* | (2022.01) |
| *H04L 69/324* | (2022.01) |

(52) U.S. Cl.
CPC ............. *H04L 41/12* (2013.01); *G06F 13/28* (2013.01); *H04L 41/0213* (2013.01); *H04L 41/0803* (2013.01); *H04L 69/324* (2013.01)

(58) Field of Classification Search
None
See application file for complete search history.

(56) References Cited

U.S. PATENT DOCUMENTS

| | | | | |
|---|---|---|---|---|
| 8,542,679 | B2* | 9/2013 | Beecroft | H04L 49/351 |
| | | | | 370/392 |
| 9,800,698 | B1* | 10/2017 | Reinbold | H04L 47/28 |
| 9,916,129 | B1 | 3/2018 | Ahmad et al. | |
| 10,284,473 | B1* | 5/2019 | Sharma | H04L 63/20 |
| 10,432,536 | B1 | 10/2019 | Subramanian et al. | |
| 10,541,934 | B1* | 1/2020 | Subramanian | H04L 49/253 |
| 10,848,331 | B2* | 11/2020 | Roy | H04L 69/16 |
| 10,853,308 | B1* | 12/2020 | Subramanian | G06F 15/17331 |
| 10,862,802 | B1* | 12/2020 | Subramanian | H04L 45/24 |
| 2004/0095884 | A1* | 5/2004 | Lee | H04Q 11/0067 |
| | | | | 370/235 |
| 2006/0161696 | A1* | 7/2006 | Anjo | G06F 15/7867 |
| | | | | 710/22 |
| 2008/0229415 | A1* | 9/2008 | Kapoor | H04L 63/14 |
| | | | | 726/22 |

(Continued)

OTHER PUBLICATIONS

MEF Technical Specification MEF 10.3, Ethernet Services Attributes Phase 3, Oct. 2013, © The MEF Forum 2013, pp. 120.

(Continued)

*Primary Examiner* — Ramy M Osman
*Assistant Examiner* — Thorne E Waugh
(74) *Attorney, Agent, or Firm* — Patterson + Sheridan, LLP

(57) ABSTRACT

An integrated circuit (IC) device includes a network device including a first network port, a second network port, and an internal endpoint port. The IC device further includes a first processing unit including an internal end station. The first processing unit is configured to communicate with the network device using the internal endpoint port. The IC device further includes a second processing unit including a bridge management layer. The second processing unit is configured to communicate with the network device using the internal endpoint port. In various embodiments, the first processing unit and the second processing unit are configured to communicate with each other using a first internal channel.

20 Claims, 8 Drawing Sheets

(56) References Cited

U.S. PATENT DOCUMENTS

| | | | |
|---|---|---|---|
| 2010/0195974 A1* | 8/2010 | Zheng | H04N 5/76 386/343 |
| 2010/0290467 A1* | 11/2010 | Eisenhauer | H04L 45/16 370/392 |
| 2014/0095884 A1* | 4/2014 | Kannavara | H04L 9/3239 713/186 |
| 2014/0173127 A1* | 6/2014 | Samuels | H04L 47/36 709/234 |
| 2017/0257398 A1* | 9/2017 | Park | H04L 63/101 |
| 2020/0195469 A1* | 6/2020 | McLean | H04L 12/40091 |
| 2020/0226078 A1* | 7/2020 | Tanaka | G06F 13/4022 |
| 2020/0267622 A1* | 8/2020 | Joseph | H04L 69/18 |
| 2020/0351752 A1* | 11/2020 | Sivasiva Ganesan | H04L 41/12 |
| 2020/0389469 A1* | 12/2020 | Litichever | H04L 63/0236 |

OTHER PUBLICATIONS

Markus Jochim, General Motors Research & Development, "Ingress Policing", IEEE 802.1 TSN Plenary, Nov. 10-15, 2013—Dallas, TX USA, pp. 43.
Stephen Haddock, "Frame Metering in 802.1Q", Version 1, Jan. 15, 2013, pp. 20, http://www.ieee802.org/1/files/public/docs2013/new-tsn-haddock-flow-metering-in-Q-0113-v01.pdf.
U.S. Appl. No. 16/195,218, filed Nov. 19, 2018, San Jose, CA USA.
U.S. Appl. No. 15/837,400, filed Dec. 11, 2017, San Jose CA USA.
U.S. Appl. No. 15/948,881, filed Apr. 9, 2018, San Jose CA USA.

\* cited by examiner

SYSTEMS AND METHODS FOR DISCOVERY AND CONFIGURATION OF A NETWORK DEVICE

FIELD

Examples of the present disclosure generally relate to integrated circuits (ICs) and, in particular, to an embodiment related to systems and methods for discovery and configuration of a network devices using an IC in a network.

BACKGROUND

In a communication system, a switching device may receive streams including frames (packets) containing data or control information via a first port, and based on destination information contained within the frames, route the frames out of the switching device via a second port and to the destination (or an intermediary destination). Many applications using the communication system, such as process control applications and machine control applications, may have many streams that are latency critical for meeting control loop frequency requirements. Moreover, communication between the switching device and other components of the communication system, such as endpoint components and a network management server, is dependent on reliable discovery and configuration of the various components of the communication system.

Accordingly, there is a need for an improved time-sensitive network capable of providing enhanced discovery and configuration of network devices.

SUMMARY

In some embodiments in accordance with the present disclosure, an integrated circuit (IC) device includes a network device having a first network port, a second network port, and an internal endpoint port. In some examples, the IC device further includes a first processing unit including an internal end station, where the first processing unit is configured to communicate with the network device using the internal endpoint port. In some embodiments, the IC device further includes a second processing unit including a bridge management layer, where the second processing unit is configured to communicate with the network device using the internal endpoint port. In some embodiments, the first processing unit and the second processing unit are configured to communicate with each other using a first internal channel.

In some embodiments, the network device further includes a frame replication and elimination for reliability (FRER) unit, where the FRER unit is configured to provide redundancy between the network device and the internal end station.

In some embodiments, the internal end station or the bridge management layer are configured to independently transmit data to or receive data from a TSN network via the first network port or the second network port.

In some embodiments, the network device further includes an endpoint packet switching module, where the endpoint packet switching module is configured to create the first internal channel.

In some embodiments, the first internal channel includes a direct memory access (DMA) channel.

In some embodiments, the bridge management layer is configured to build and maintain a link layer discovery protocol (LLDP) management information base (MIB).

In some embodiments, the bridge management layer includes a simple network management protocol (SNMP) interface that is utilized to build and maintain the LLDP MIB.

In some embodiments, the bridge management layer includes a plurality of network interfaces for managing point-to-point (PTP) control frames.

In some embodiments, a network interface of the bridge management layer is configured to receive a PTP control frame from the internal end station on a first DMA channel.

In some embodiments, the internal end station includes a network interface for managing PTP control frames, where the network interface of the internal end station is configured to send a PTP control frame to the bridge management layer.

In some embodiments in accordance with the present disclosure, a time-sensitive networking (TSN) device includes an Ethernet switch having an endpoint packet switching module. In some embodiments, the TSN device further includes an internal end station coupled to the Ethernet switch via a multichannel direct memory access (DMA) coupled to an endpoint port of the Ethernet switch. In some embodiments, the TSN device further includes a bridge management device coupled to the Ethernet switch via the multichannel DMA coupled to the endpoint port of the Ethernet switch. In some embodiments, the endpoint packet switching module is configured to utilize the multichannel DMA to provide an independent communication path between the internal end station and the bridge management device.

In some embodiments, the independent communication path includes an additional DMA channel.

In some embodiments, each of the Ethernet switch and the internal end station are configured to be independently discovered and managed within an Ethernet network.

In some embodiments, the multichannel DMA provides an interface to multiple CPU cores, where a first one of the multiple CPU cores is configured to implement a first set of functions associated with the internal end station, and where a second one of the multiple CPU cores is configured to implement a second set of functions associated with the bridge management device.

In some embodiments, the endpoint packet switching module is configured to perform a switch back of a point-to-point control frame received from one of the internal end station and the bridge management device to the other of the internal end station and the bridge management device.

In some embodiments in accordance with the present disclosure, a method includes receiving a control frame from an internal endpoint port of a bridge, where the internal endpoint port is shared between a bridge management device and an internal end station. In some examples, the method further includes determining whether a source MAC address of the received control frame is equal to an internal end station MAC address or to a bridge endpoint port MAC address. In some embodiments and based on determining that the source MAC address is equal to the internal end station MAC address, a switch back of the control frame to the bridge management device is performed using an endpoint packet switching module.

In some embodiments and based on determining that the source MAC address is equal to the bridge endpoint port MAC address, the switch back of the control frame to the internal end station is performed using the endpoint packet switching module.

In some embodiments, the method further includes determining that the source MAC address of the received control frame is equal to a first bridge MAC port address and forwarding the received control frame to the first bridge MAC port.

In some embodiments, the method further includes determining that the source MAC address of the received control frame is not equal to the first bridge MAC port address and forwarding the received control frame to a second bridge MAC port.

In some embodiments, the endpoint packet switching module is configured to snoop frames received at the internal endpoint port of a bridge, and based on the snooping, the endpoint packet switching module is configured to perform the determining.

Other aspects and features will be evident from reading the following detailed description and accompanying drawings.

DETAILED DESCRIPTION

Figure 1:
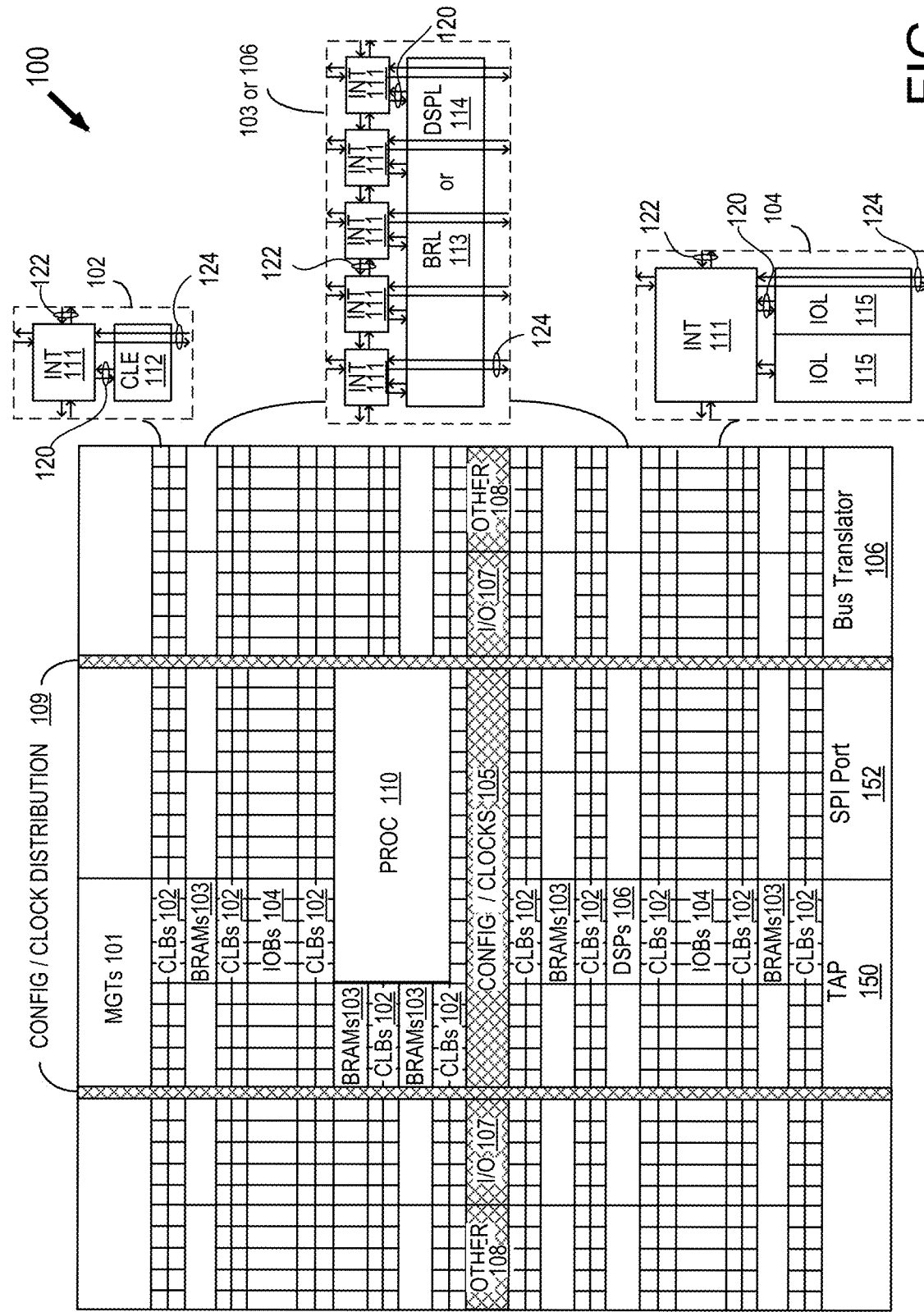
FIG. 1 is a block diagram illustrating an exemplary architecture for an IC according to some embodiments of the present disclosure.

Various embodiments are described hereinafter with reference to the figures, in which exemplary embodiments are shown. The claimed invention may, however, be embodied in different forms and should not be construed as being limited to the embodiments set forth herein. Like reference numerals refer to like elements throughout. Like elements will, thus, not be described in detail with respect to the description of each figure. It should also be noted that the figures are only intended to facilitate the description of the embodiments. They are not intended as an exhaustive description of the claimed invention or as a limitation on the scope of the claimed invention. In addition, an illustrated embodiment need not have all the aspects or advantages shown. An aspect or an advantage described in conjunction with a particular embodiment is not necessarily limited to that embodiment and can be practiced in any other embodiments even if not so illustrated, or if not so explicitly described. The features, functions, and advantages may be achieved independently in various embodiments or may be combined in yet other embodiments.

Before describing exemplary embodiments illustratively depicted in the several figures, a general introduction is provided to further understanding.

In an effort to provide the low-latency networks demanded by many network applications, Time-Sensitive Networking (TSN) technology has been defined by the IEEE 802 set of standards to provide deterministic, real-time communication over Ethernet. In a TSN system, time-sensitive Ethernet frames (e.g., defined by IEEE standards) are typically pre-negotiated for identification mechanism, network paths, bandwidth, fault tolerance and recovery mechanisms. These frames are periodically sent over the network and may also be referred to as streams. For real-time communication of time-sensitive streams (e.g., in industrial control applications, digital video and audio data) over Ethernet, network devices in a TSN system implement low latency, non-blocking, and highly deterministic frame forwarding mechanisms. The TSN standards define network devices such as bridges (e.g., also referred to as Ethernet switches) and endpoint components (e.g., talkers and listeners) to be part of a time aware system. Thus, a TSN system may also be referred to as a time aware system. In various examples, an endpoint component may also be referred to as an end station. Generally, a TSN system may include bridges and end stations as separate components connected via an Ethernet Link. When a TSN bridge and an end station are in two separate devices, they do not provide complete end-to-end redundancy. Alternatively, when both a TSN bridge and end station are integrated into a single device, then complete end-to-end redundancy can be achieved in a time-sensitive network. Since end-to-end redundancy is a critical component of TSN systems, having an integrated bridge and end station provides a significant value addition. However, discovery, configuration, and management of such an integrated bridge and end station device in a TSN system remains a challenge.

By way of example, Link Layer Discovery Protocol (LLDP) provides a point-to-point protocol that may be used by network devices for advertising their identity and capabilities and also for knowing the identities and capabilities of neighboring devices in an Ethernet network. As such, LLDP may be used for discovering a network topology. Information acquired and/or needed by LLDP may be stored in respective network devices as an LLDP management information base (MIB). The information stored in the MIB can be queried using Simple Network Management Protocol (SNMP) (e.g., to perform network management functions). Generally, LLDP allows a network device to be advertised as a bridge or as an end station, but it does not specify how a solution that provides an integrated bridge/end station device can be advertised. For this reason, a typical TSN solution may opt to maintain bridges and end stations as separate components. To be sure, even when a TSN bridge and end station are integrated into one device, it may be necessary to pre-configure and/or manually configure the integrated bridge/end station device.

For integrated circuit (IC) solutions, it has been discovered that LLDP and SNMP may be used for automatic, independent discovery and management of a TSN bridge and end station, integrated within a single device, in an Ethernet network, thereby addressing the various challenges associated with at least some current solutions. For example, embodiments discussed herein include systems and methods that provide an integrated bridge and end station (e.g., utilizing an FPGA fabric and embedded processors) while also enabling each of the bridge and end station to be independently discovered and managed in an Ethernet network (e.g., using LLDP and SNMP). In various embodiments, LLDP may be used to build the MIB while SNMP may be used to query and manage the integrated bridge/end station device. Further, in some embodiments, network management controllers (defined by IEEE standards) such as a centralized network controller (CNC) (e.g., for TSN bridges) and a centralized user configuration (CUC) (e.g., for end stations) may be used to independently configure and manage each of the TSN bridge and the end station in the integrated bridge/end station device. Additional embodiments and advantages are discussed below and/or will be evident to those skilled in the art in possession of this disclosure.

With the above general understanding borne in mind, various embodiments for discovery, configuration, and management of an integrated bridge/end station device are generally described below. Various advantages may be present in various applications of the present disclosure. No particular advantage is required for all embodiments, and different embodiments may offer different advantages.

Because one or more of the above-described embodiments are exemplified using a particular type of IC, a detailed description of such an IC is provided below. However, it should be understood that other types of ICs may benefit from one or more of the embodiments described herein.

Programmable logic devices ("PLDs") are a well-known type of integrated circuit that can be programmed to perform specified logic functions. One type of PLD, the field programmable gate array ("FPGA"), typically includes an array of programmable tiles. These programmable tiles can include, for example, input/output blocks ("IOBs"), configurable logic blocks ("CLBs"), dedicated random access memory blocks ("BRAMs"), multipliers, digital signal processing blocks ("DSPs"), processors, clock managers, delay lock loops ("DLLs"), and so forth. As used herein, "include" and "including" mean including without limitation.

Each programmable tile typically includes both programmable interconnect and programmable logic. The programmable interconnect typically includes a large number of interconnect lines of varying lengths interconnected by programmable interconnect points ("PIPs"). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of PLD is the Complex Programmable Logic Device (CPLD). A CPLD includes two or more "function blocks" connected together and to input/output ("I/O") resources by an interconnect switch matrix. Each function block of the CPLD includes a two-level AND/OR structure similar to those used in Programmable Logic Arrays ("PLAs") and Programmable Array Logic ("PAL") devices. In CPLDs, configuration data is typically stored on-chip in non-volatile memory. In some CPLDs, configuration data is stored on-chip in non-volatile memory, then downloaded to volatile memory as part of an initial configuration (programming) sequence.

In general, for each of these programmable logic devices ("PLDs"), the functionality of the device is controlled by configuration data provided to the device for that purpose. The configuration data can be stored in volatile memory (e.g., static memory cells, as common in FPGAs and some CPLDs), in non-volatile memory (e.g., FLASH memory, as in some CPLDs), or in any other type of memory cell.

Other PLDs are programmed by applying a processing layer, such as a metal layer, that programmably interconnects the various elements on the device. These PLDs are known as mask programmable devices. PLDs can also be implemented in other ways, e.g., using fuse or antifuse technology. The terms "PLD" and "programmable logic device" include but are not limited to these exemplary devices, as well as encompassing devices that are only partially programmable. For example, one type of PLD includes a combination of hard-coded transistor logic and a programmable switch fabric that programmably interconnects the hard-coded transistor logic.

As noted above, advanced FPGAs can include several different types of programmable logic blocks in the array. For example, FIG. 1 illustrates an exemplary FPGA architecture 100. The FPGA architecture 100 includes a large number of different programmable tiles, including multi-gigabit transceivers ("MGTs") 101, configurable logic blocks ("CLBs") 102, random access memory blocks ("BRAMs") 103, input/output blocks ("IOBs") 104, configuration and clocking logic ("CONFIG/CLOCKS") 105, digital signal processing blocks ("DSPs") 106, specialized input/output blocks ("I/O") 107 (e.g., configuration ports and clock ports), and other programmable logic 108 such as digital clock managers, analog-to-digital converters, system monitoring logic, and so forth. Some FPGAs also include dedicated processor blocks ("PROC") 110.

In some FPGAs, each programmable tile can include at least one programmable interconnect element ("INT") 111 having connections to input and output terminals 120 of a programmable logic element within the same tile, as shown by examples included at the top of FIG. 1. Each programmable interconnect element 111 can also include connections to interconnect segments 122 of adjacent programmable interconnect element(s) in the same tile or other tile(s). Each programmable interconnect element 111 can also include connections to interconnect segments 124 of general routing resources between logic blocks (not shown). The general routing resources can include routing channels between logic blocks (not shown) comprising tracks of interconnect segments (e.g., interconnect segments 124) and switch blocks (not shown) for connecting interconnect segments. The interconnect segments of the general routing resources (e.g., interconnect segments 124) can span one or more logic blocks. The programmable interconnect elements 111 taken together with the general routing resources implement a programmable interconnect structure ("programmable interconnect") for the illustrated FPGA.

In an example implementation, a CLB 102 can include a configurable logic element ("CLE") 112 that can be programmed to implement user logic plus a single programmable interconnect element ("INT") 111. A BRAM 103 can include a BRAM logic element ("BRL") 113 in addition to one or more programmable interconnect elements. Typically, the number of interconnect elements included in a tile depends on the height of the tile. In the pictured example, a BRAM tile has the same height as five CLBs, but other numbers (e.g., four) can also be used. A DSP tile 106 can include a DSP logic element ("DSPL") 114 in addition to an appropriate number of programmable interconnect elements. An IOB 104 can include, for example, two instances of an input/output logic element ("IOL") 115 in addition to one instance of the programmable interconnect element 111. As will be clear to those of skill in the art, the actual I/O pads connected, for example, to the I/O logic element 115 typically are not confined to the area of the input/output logic element 115.

In the example of FIG. 1, an area (depicted horizontally) near the center of the die (e.g., formed of regions 105, 107, and 108 shown in FIG. 1) can be used for configuration, clock, and other control logic. Column 109 (depicted vertically) extending from this horizontal area or other columns may be used to distribute the clocks and configuration signals across the breadth of the FPGA.

Some FPGAs utilizing the architecture illustrated in FIG. 1 include additional logic blocks that disrupt the regular columnar structure making up a large part of the FPGA. The additional logic blocks can be programmable blocks and/or dedicated logic. For example, PROC 110 spans several columns of CLBs and BRAMs. PROC 110 can include various components ranging from a single microprocessor to a complete programmable processing system of microprocessor(s), memory controllers, peripherals, and the like.

In one aspect, PROC 110 is implemented as a dedicated circuitry, e.g., as a hard-wired processor, that is fabricated as part of the die that implements the programmable circuitry of the IC. PROC 110 can represent any of a variety of different processor types and/or systems ranging in complexity from an individual processor, e.g., a single core capable of executing program code, to an entire processor system having one or more cores, modules, co-processors, interfaces, or the like.

In another aspect, PROC 110 is omitted from architecture 100, and may be replaced with one or more of the other varieties of the programmable blocks described. Further, such blocks can be utilized to form a "soft processor" in that the various blocks of programmable circuitry can be used to form a processor that can execute program code, as is the case with PROC 110.

The phrase "programmable circuitry" can refer to programmable circuit elements within an IC, e.g., the various programmable or configurable circuit blocks or tiles described herein, as well as the interconnect circuitry that selectively couples the various circuit blocks, tiles, and/or elements according to configuration data that is loaded into the IC. For example, portions shown in FIG. 1 that are external to PROC 110 such as CLBs 102 and BRAMs 103 can be considered programmable circuitry of the IC.

In some embodiments, the functionality and connectivity of programmable circuitry are not established until configuration data is loaded into the IC. A set of configuration data can be used to program programmable circuitry of an IC such as an FPGA. The configuration data is, in some cases, referred to as a "configuration bitstream." In general, programmable circuitry is not operational or functional without first loading a configuration bitstream into the IC. The configuration bitstream effectively implements or instantiates a particular circuit design within the programmable circuitry. The circuit design specifies, for example, functional aspects of the programmable circuit blocks and physical connectivity among the various programmable circuit blocks.

In some embodiments, circuitry that is "hardwired" or "hardened," i.e., not programmable, is manufactured as part of the IC. Unlike programmable circuitry, hardwired circuitry or circuit blocks are not implemented after the manufacture of the IC through the loading of a configuration bitstream. Hardwired circuitry is generally considered to have dedicated circuit blocks and interconnects, for example, that are functional without first loading a configuration bitstream into the IC, e.g., PROC 110.

In some instances, hardwired circuitry can have one or more operational modes that can be set or selected according to register settings or values stored in one or more memory elements within the IC. The operational modes can be set, for example, through the loading of a configuration bitstream into the IC. Despite this ability, hardwired circuitry is not considered programmable circuitry as the hardwired circuitry is operable and has a particular function when manufactured as part of the IC.

FIG. 1 is intended to illustrate an exemplary architecture that can be used to implement an IC that includes programmable circuitry, e.g., a programmable fabric. For example, the numbers of logic blocks in a row, the relative width of the rows, the number and order of rows, the types of logic blocks included in the rows, the relative sizes of the logic blocks, and the interconnect/logic implementations included at the top of FIG. 1 are purely exemplary. For example, in an actual IC, more than one adjacent row of CLBs is typically included wherever the CLBs appear, to facilitate the efficient implementation of user logic, but the number of adjacent CLB rows varies with the overall size of the IC. Moreover, the FPGA of FIG. 1 illustrates one example of a programmable IC that can employ examples of the interconnect circuits described herein. The interconnect circuits described herein can be used in other types of programmable ICs, such as CPLDs or any type of programmable IC having a programmable interconnect structure for selectively coupling logic elements.

It is noted that the ICs that may implement the methods and systems for discovery and configuration of a network devices are not limited to the exemplary IC depicted in FIG. 1, and that ICs having other configurations, or other types of ICs, may also implement the methods and systems for discovery and configuration of a network devices.

Figure 2A:
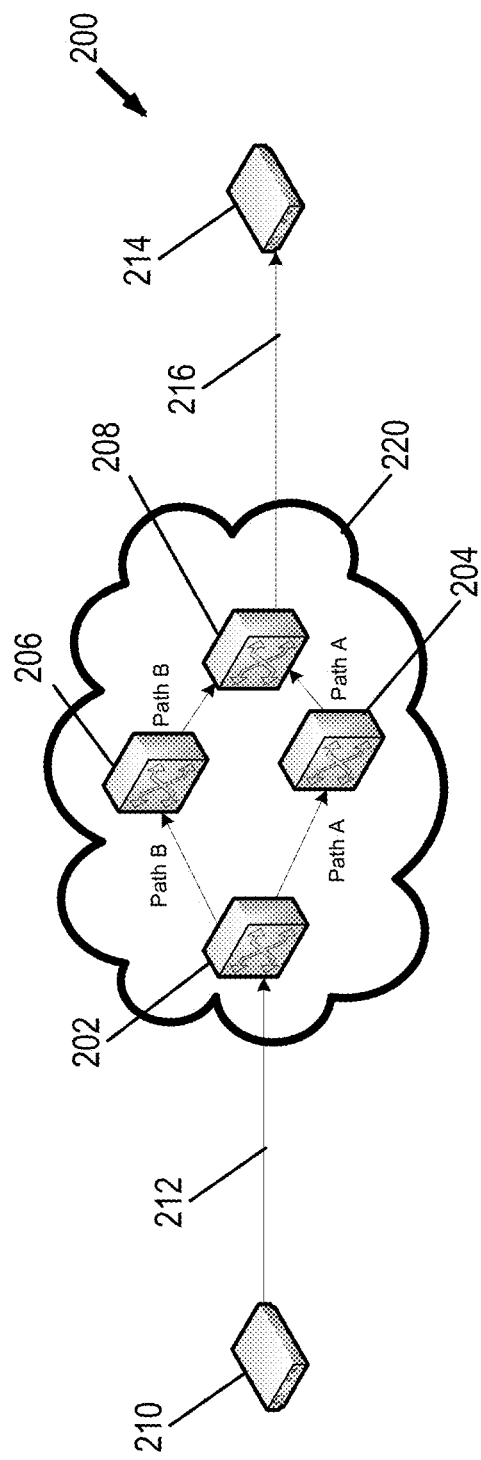
FIG. 2A illustrates an exemplary TSN network having bridges and end stations as separate components connected via an Ethernet Link, according to some embodiments.

Referring to FIG. 2A, illustrated therein is an exemplary system 200 including a TSN network 220. In particular, the system 200 shows an example of having bridges and end stations as separate components connected via an Ethernet Link. As shown, the TSN network 220 may include TSN bridges 202, 204, 206, 208, where a sequence of the TSN bridges 202-204-208 defines a first path (Path A), and where a sequence of the TSN bridges 202-206-208 defines a second path (Path B). The system 200 may further include a talker end station 210 coupled to the TSN bridge 202 via an Ethernet Link 212 and a listener end station 214 coupled to the TSN bridge 208 via an Ethernet Link 216. The TSN network 220, but not the entire system 200, provides redundancy (e.g., Frame Replication and Elimination for Reliability or FRER), defined by IEEE standards, where a stream originating at the talker end station 210 is replicated each time an additional unique path is detected through the TSN network 220. For instance, a stream originating at the talker end station 210 may be replicated (at the TSN bridge 202), where a first copy of the stream is transmitted along the first path (Path A) and a second copy of the stream is transmitted along the second path (Path B). At the TSN bridge 208, which is coupled to the listener end station 214, a first valid frame received for the transmitted stream is forwarded to the listener end station 214 (e.g., via the Ethernet Link 216) and all other replicated or errored frames in the transmitted stream are discarded. Stated another way, the stream may be thought of as being split at the TSN bridge 202 and merged at the TSN bridge 208. By way of such a process, instead of retransmitting errored frames, frames are replicated for both reliability and time sensitivity. This provides a seamless stream of information and ensures high availability for data sent over the TSN network 220. However, as noted above, when a TSN bridge and an end station are in two separate devices (e.g., such as the talker end station 210 and the TSN bridge 202, or the listener end station 214 and the TSN bridge 208), the links connecting the two separate devices (e.g., such as the Ethernet Links 212, 216) are not protected under FRER and hence the system 200 cannot provide complete end-to-end redundancy (e.g., from the talker end station 210 to the listener end station 214).

Figure 2B:
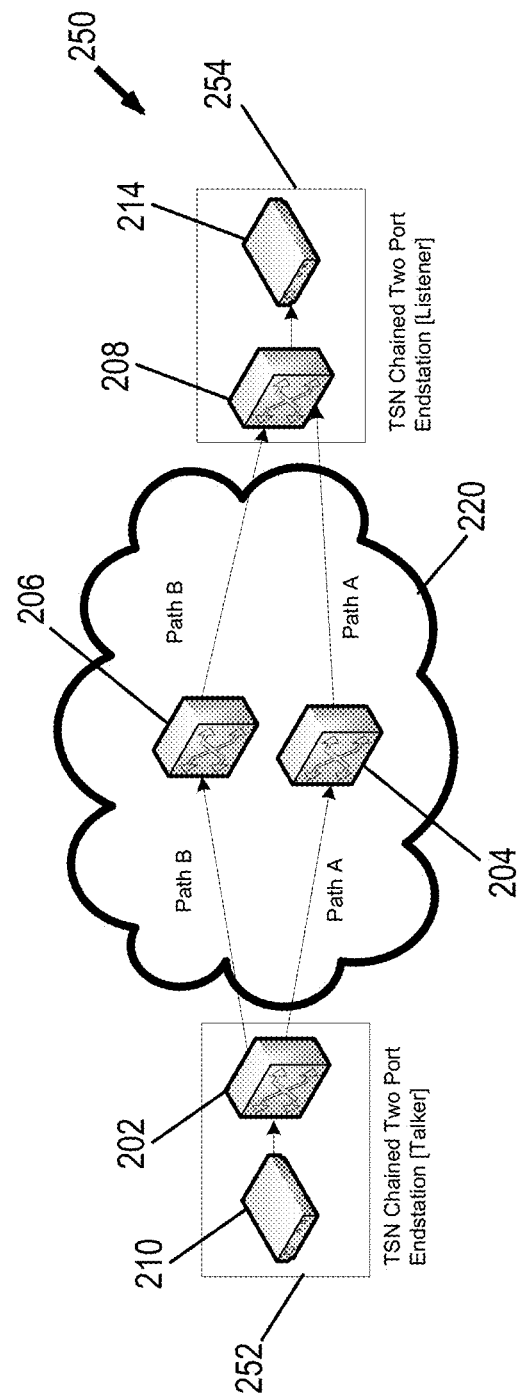
FIG. 2B illustrates an exemplary TSN network having a bridge and end station integrated into a single device, according to some embodiments.

In contrast, and as previously discussed, when both a TSN bridge and end station are integrated into a single device, then complete end-to-end redundancy can be achieved. With reference to FIG. 2B, illustrated therein is an exemplary system 250 including the TSN network 220, where a bridge and end station are integrated into a single device. Some aspects of the system 250 may be similar to elements of the system 200, discussed above, thus for clarity of discussion some of the reference numerals shown in FIG. 2B are the same as those shown in FIG. 2A. In some embodiments, a device 252 may include both the talker end station 210 and the TSN bridge 202, and a device 254 may include both the listener end station 214 and the TSN bridge 208. Further, in the example of FIG. 2B, the TSN network 220 includes TSN bridges 204, 206. Similar to the system 200, the system 250 of FIG. 2B illustrates the sequence of the TSN bridges 202-204-208 defining the first path (Path A) and the sequence of the TSN bridges 202-206-208 defining the second path (Path B). In contrast to the system 200, and still referring to the system 250 of FIG. 2B, a stream originating at the talker end station 210 (within the device 252) may be split at the TSN bridge 202 (also within the device 252) and transmitted along the first and second paths (the paths A and B) and may subsequently be merged at the TSN bridge 208 (within the device 254). In particular, because the talker end station 210 and the TSN bridge 202 are integrated within the device 252 (rather than being coupled via the Ethernet Link 212), and because the listener end station 214 and the TSN bridge 208 are integrated within the device 254 (rather than being coupled via the Ethernet Link 216), the system 250 provides complete end-to-end redundancy.

Figure 3:
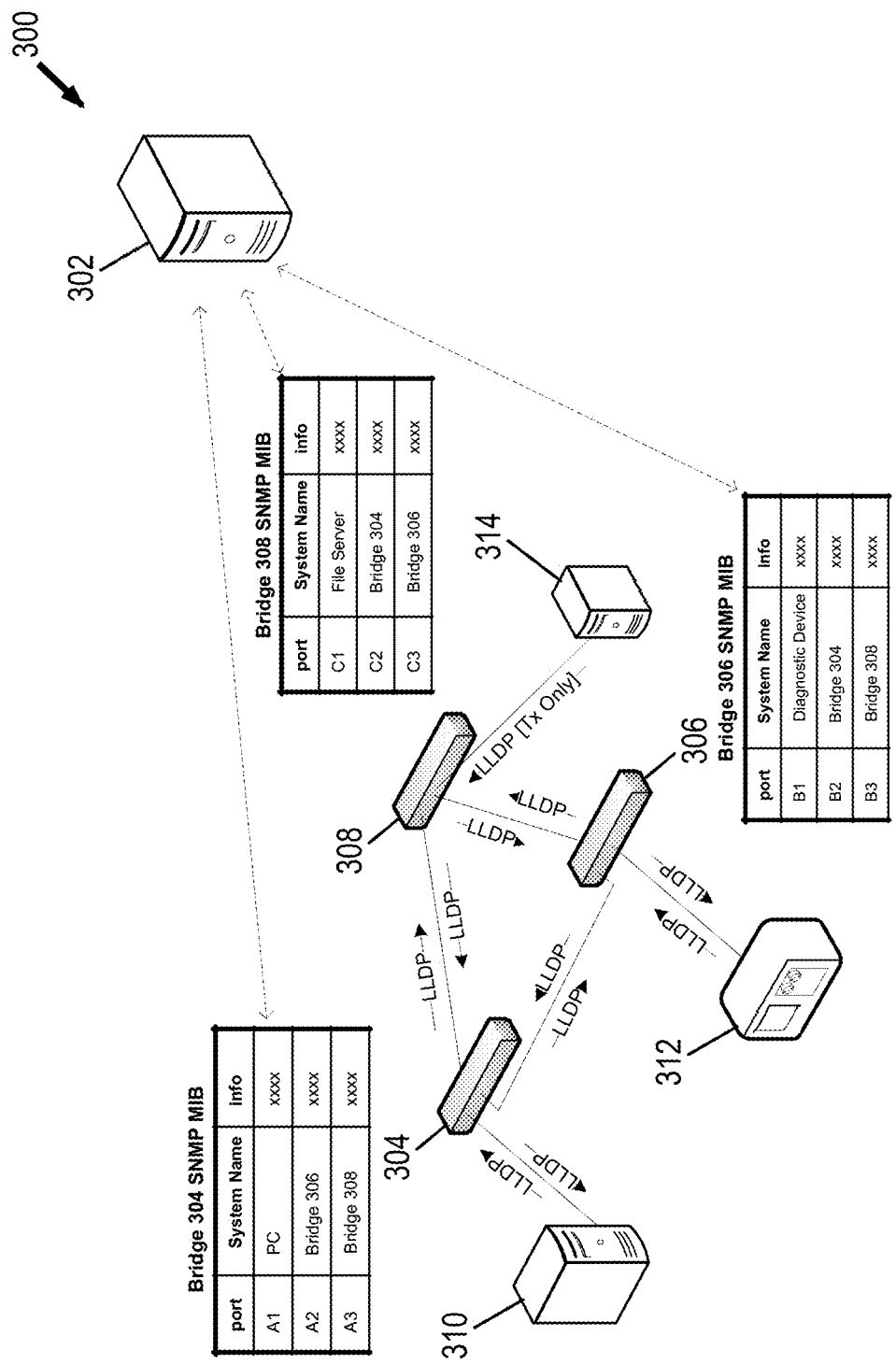
FIG. 3 illustrates a network showing exemplary communication between various network devices using LLDP and SNMP protocols to provide network management and discovery of network devices, in accordance with some embodiments.

In various embodiments, automatic, independent discovery and management of TSN bridges and end stations integrated into a single device (e.g., such as the devices 252, 254) is provided using LLDP and SNMP protocols. To provide further understanding, FIG. 3 illustrates a network 300 showing exemplary communication between various network devices using LLDP and SNMP protocols to provide network management and discovery of network devices. In the illustrated example, the network 300 includes a network management server 302 (e.g., such as an SNMP server) and network devices including bridges 304, 306, 308 and endpoint components 310, 312, 314. In some examples, the bridges 304, 306, 308 may include TSN bridges. In the example of FIG. 3, the endpoint component 310 may include a personal computer (PC), the endpoint component 312 may include a diagnostic device, and the endpoint component 314 may include a file server. More generally, the endpoint components 310, 312, 314 may include talkers and listeners, or other type of LLDP-enabled device. In various embodiments, each of the bridges 304, 306, 308 also includes a respective SNMP MIB (illustrated schematically as a table adjacent to each of the bridges 304, 306, 308) stored in memory therein. LLDP frames (advertisements) exchanged between neighboring network devices (illustrated as -LLDP→) provide the information stored in the SNMP MIB associated with each of the bridges 304, 306, 308. In the present example, the bridge 304 includes a 'Bridge 304 SNMP MIB', the bridge 306 includes a 'Bridge 306 SNMP MIB', and the bridge 308 includes a 'Bridge 308 SNMP MIB'. As shown, each SNMP MIB includes information related to specific network devices (e.g., such as device configuration, identity, and capabilities) coupled to various bridge ports. By way of illustration, the 'Bridge 304 SNMP MIB' contains information related to the endpoint component 310 (PC) coupled to port 'A1' of the bridge 304, the bridge 306 coupled to port 'A2' of the bridge 304, and the bridge 308 coupled to port 'A3' of the bridge 304. Similarly, the 'Bridge 306 SNMP MIB' contains information related to the endpoint component 312 (diagnostic device) coupled to port 'B1' of the bridge 306, the bridge 304 coupled to port 'B2' of the bridge 306, and the bridge 308 coupled to port 'B3' of the bridge 306. The 'Bridge 308 SNMP MIB' contains information related to the endpoint component 314 (file server) coupled to port 'C1' of the bridge 308, the bridge 304 coupled to port 'C2' of the bridge 308, and the bridge 306 coupled to port 'C3' of the bridge 308.

As previously described, LLDP provides a point-to-point protocol that supports network topology discovery (of the network 300, in the present example) and exchange of device configuration, identity, and capabilities between neighboring devices (e.g., such as the bridges 304, 306, 308 and the endpoint components 310, 312, 314). LLDP frames are sent one-way (between neighboring network devices) and are sent periodically. Further, LLDP frames that are sent between neighboring devices are not forwarded but are constrained to a single point-to-point link. By way of example, LLDP frames contain formatted TLVs (type, length, value) including Time-to-Live (TTL) information for ageing purposes. More specifically, the TTL information represents a length of time that information contained in the received LLDP frame shall be valid. In various embodiments, a receiver (e.g. of the LLDP frame) may store information in a neighbor database, which is accessible via SNMP MIB. In operation, and with respect to the present example (FIG. 3), the network management server 302 may communicate with each of the bridges 304, 306, 308 in the network 300 to discover and manage each of the devices in the network 300. In various embodiments, the network management server 302 may be placed on one of the network interfaces or can be connected to a dedicated management port that may be optionally provided by the bridges 304, 306, 308.

Figure 4:
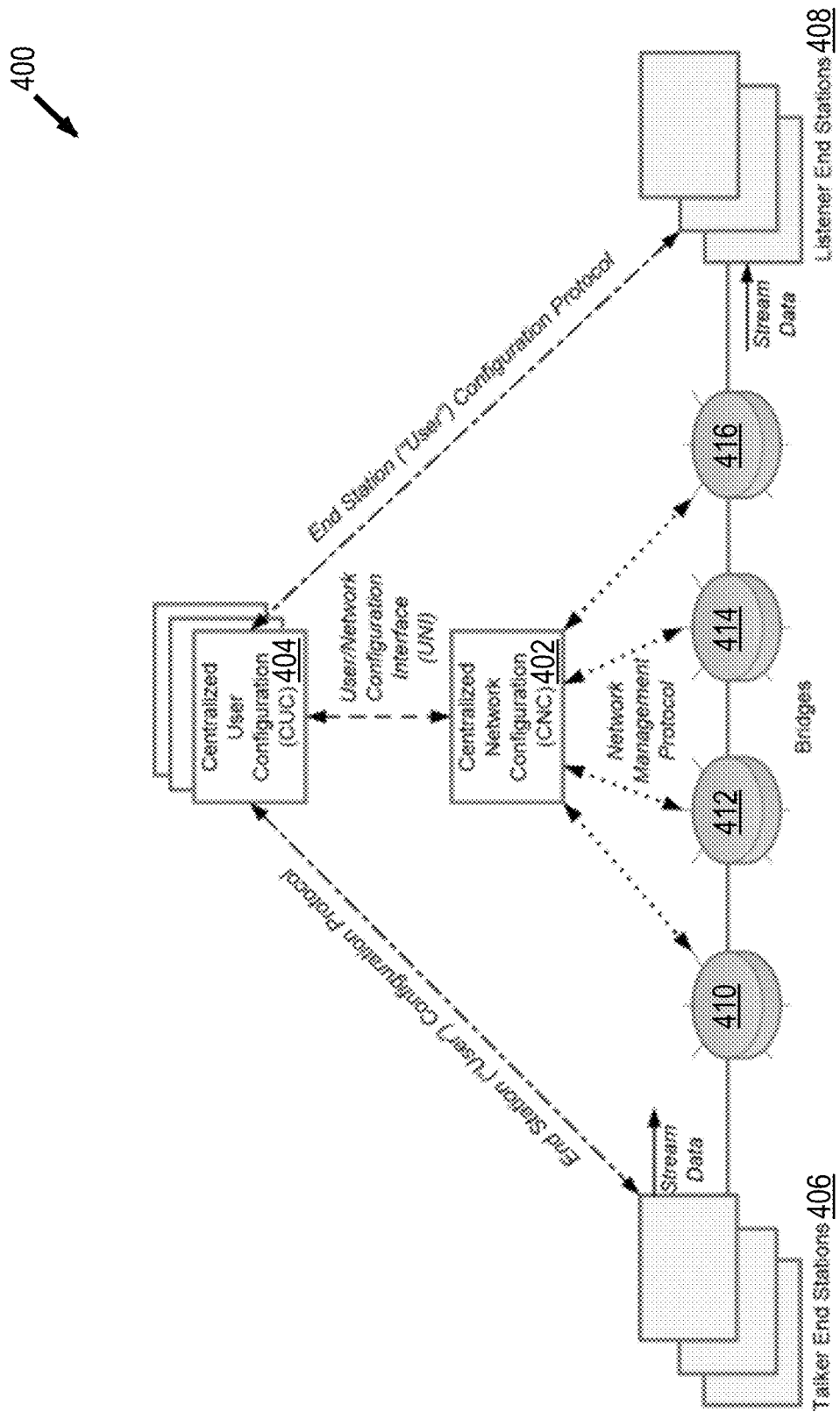
FIG. 4 illustrates a network topology for an exemplary TSN network, according to some embodiments.

As noted, time-sensitive networks may include network management controllers (defined by IEEE standards) such as a CNC (e.g., for bridge management) and a CUC (e.g., for end station management). The IEEE standards, which define the CNC and the CUC, also provide standards for reservations of time-critical streams, while still maintaining compatibility with standard network equipment. In other words, this means that configuration of streams may only be necessary for network traffic that requires real-time guarantees, while regular (non-critical) network traffic does not need to be configured. Such configuration of streams may be accomplished within a TSN network, such as shown in FIG. 4, which illustrates an exemplary TSN network 400. In particular, the TSN network 400 provides a CNC 402, a CUC 404, talker end stations 406, listener end stations 408, and TSN bridges 410, 412, 414, 416. In some embodiments, the CUC 404 may communicate with the CNC 402 (e.g., using a User/Network Configuration Interface, UNI) and with each of the talker end stations 406 and the listener end stations 408 (e.g., using an end station configuration protocol). By way of example, the CUC 404 may receive requirements (for streams to be transmitted through the TSN network 400) from the talker and listener end stations 406, 408 and/or detect transmission availability. After determining the communication requirements between the sending devices (talker end stations 406) and the receiving devices (listener end stations 408), this information is provided to the CNC 402. The CNC 402 has fully and global knowledge of network resources and network topology (e.g., which may be discovered using LLDP). Generally, the CNC 402 is responsible for determining routes and scheduling streams through the TSN network 400, and for configuration of the TSN bridges 410, 412, 414, 416. In various examples, communication between the CNC 402 and the TSN bridges 410, 412, 414, 416 may be performed using a network management protocol such as SNMP, RESTCONF, and/or NETCONF. The CNC 402 may thus use the communications requirements provided by the CUC 404 to find a path through the TSN network 400 that satisfies the communication requirements between the talker and listener end stations 406, 408. The path determined by the CNC 402 may then be configured as the transmission path for the stream between the talker and listener end stations 406, 408. The IEEE standards also specify that LLDP may be used as a mechanism to build the MIB for devices (e.g., such as the talker end stations 406, the listener end stations 408, and the TSN bridges 410, 412, 414, 416) within the TSN network 400. In some cases, the CNC 402 may then utilize the RESTCONF and NETCONF protocols (network configuration protocols established by the Internet Engineering Task Force (IETF), an open standards organization) to configure and manage the devices in the TSN network 400.

Figure 5:
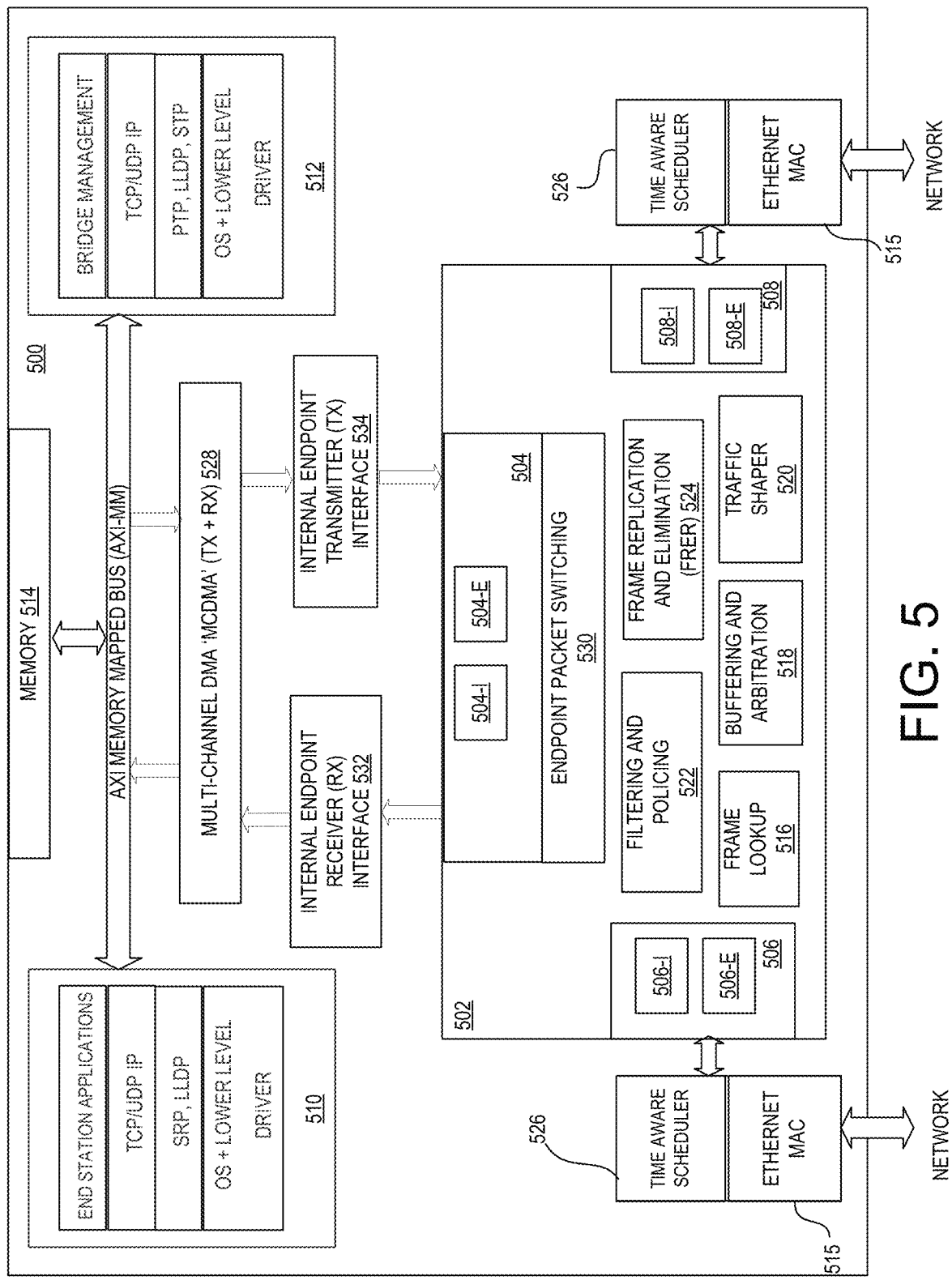
FIG. 5 illustrates is an integrated circuit (IC) including a TSN bridge integrated with an internal end station on the IC, according to some embodiments.

With reference now to FIG. 5, illustrated is an IC 500 including a TSN bridge 502 integrated with an internal end station (e.g., processing unit 510) on the IC 500. In various embodiments, the IC 500 further includes a bridge management layer (e.g., processing unit 512), for example for managing the TSN bridge 502. In some embodiments, the processing unit 510 may be referred to as internal end station 510 and the processing unit 512 may be referred to as bridge management layer 512 or bridge management 512. The TSN bridge 502 includes three ports 504, 506, 508. However, in some embodiments, the TSN bridge 502 may include a four-port bridge. The port 504 connects to the processing unit 510, a memory 514, and the processing unit 512 through internal buses. In at least some embodiments, the memory 514 includes a shared dynamic random-access memory (DRAM) or a shared external DRAM. As such, the port 504 is also referred to as an internal endpoint port 504 or endpoint port 504. The ports 506 and 508 are connected to an external network through a network interface (e.g., an Ethernet media access control (MAC) interface 515). As such, ports 506 and 508 are also referred to as network ports 506 and 508. Each of the ports 504, 506, 508 includes an ingress port (e.g., ingress ports 504-I, 506-I, 508-I) and an egress port (e.g., 504-E, 506-E, and 508-E).

In some embodiments, the IC 500, including the TSN bridge 502 and integrated internal end station, supports queues having different traffic flow priorities (e.g., a scheduled priority, a reserved priority, a best effort priority). For example, a scheduled queue (e.g., including control data) may have a scheduled priority, which indicates that the frames in the scheduled queue are time critical, and have a priority higher than other priorities. As a further example, a reserved queue (e.g., including audio/video data) may have a reserved priority, indicating that the frames in the reserved queue have a lower priority than the scheduled priority. As a further example, a best effort queue may have a best effort priority, which indicates that the frames in that best effort queue are not time critical and have a lower priority than the reserved priority. In some cases, the best effort queue is utilized for non-time sensitive traffic, which may include LLDP control frame exchanges and SNMP server communications. In various embodiments, the traffic flows (having different priorities) may have their associated end station applications in the processing unit 510, where a multi-channel direct memory access (DMA) 528 is used to transfer Ethernet frames generated or consumed by the respective end station applications.

In the example of FIG. 5, the TSN bridge 502 includes a frame lookup unit 516, a buffering and arbitration unit 518, a traffic shaper 520, a filtering and policing unit 522, and a FRER unit 524. The frame lookup unit 516 may look up values (e.g., translations, actions) associated with a particular frame (e.g., received at an ingress port). The frame lookup unit 516 may also identify an egress port for the particular frame or identify endpoint packet switching. The buffering and arbitration unit 518 may perform buffering and arbitration for streams received from different ingress ports. The traffic shaper 520 may perform queuing functions and transmission functions and forward the selected frames to the corresponding egress ports. The filtering and policing unit 522 may perform filtering using various filtering rules on a per stream basis and output a filtering decision (e.g., allowing, dropping, or blocking). In some embodiments, the filtering and policing unit 522 may also perform a metering function based on bandwidth profiles, and provide metering decisions (e.g., marking including red, yellow, green) for each frame. The filtering and policing unit 522 may further police the network traffic by performing various actions (e.g., allowing, dropping, marking) to the frames based on the filtering decisions and metering decisions. The FRER unit 524 may perform a per stream frame replication and elimination function to avoid frame loss (e.g., due to equipment failure). In various examples, because the TSN bridge 502 and the internal end station (e.g., processing unit 510) are integrated within the IC 500, with the connection between the TSN bridge 502 and the internal end station protected under FRER, complete end-to-end redundancy can be provided. The FRER unit 524 may also control the network traffic by performing various actions based on the frame lookup values from the frame lookup unit 516, filtering decisions, and/or a combination thereof, and may also be referred to as a traffic control circuit 524.

In some embodiments, time aware schedulers 526 may be implemented on egress paths of the TSN bridge 502. The egress paths may include an egress path using the egress port 506-E, and an egress path using the egress port 508-E. The time aware schedulers 526 may block non-scheduled queues, so that the corresponding port is idle when the scheduled queue is scheduled for transmission. While in the example of FIG. 5, an egress path including an egress port 504-E of the internal endpoint port 504 does not include a time aware scheduler 526, in other examples, the egress path including an egress port 504-E may also include a time aware scheduler 526. In other examples, a time aware scheduler 526 may be implemented on an egress path (egress port) of the internal end station (e.g., processing unit 510), and/or on an egress path (egress port) of the bridge management layer (e.g., processing unit 512), interfacing logic (e.g., including the multi-channel DMA 528) connecting to the TSN bridge 502. In various embodiments, use of the time aware schedulers 526 allows for cut-through operations (e.g., where a transmit process may begin before a whole frame is received) to help streamline data and to reduce latency (e.g., such as latencies associated with the TSN bridge 502).

In some embodiments, the internal end station (e.g., processing unit 510) and/or the bridge management layer (e.g., processing unit 512) may independently send data to the TSN network, and/or independently receive data from the TSN network. In some embodiments, the TSN bridge 502 may be configured to broadcast a frame received from a network port (e.g., network port 506 or 508) to the internal end station (e.g., processing unit 510), the bridge management layer (e.g., processing unit 512), and/or the other network port. In some embodiments, the TSN bridge 502 may be configured to broadcast a frame received from the internal end station (e.g., processing unit 510) and/or the bridge management layer (e.g., processing unit 512) to network ports (e.g., network port 506 or 508).

The TSN bridge 502 also includes an endpoint packet switching module 530. The endpoint packet switching module 530 utilizes the multichannel DMA 528 to create additional DMA channel(s). In some embodiments, an additional DMA channel establishes an independent communication path between the internal end station (e.g., processing unit 510) and the bridge management layer (e.g., processing unit 512). By way of example, the additional DMA channel is similar to a physical Ethernet Link connecting an end station and a bridge when the end station and the bridge are implemented in separate devices (e.g., such as the talker end station 210 connected to the TSN bridge 202 via the Ethernet Link 212, or the listener end station 214 coupled to the TSN bridge 208 via the Ethernet Link 216). However, as shown in the example of FIG. 5, instead of using a physical Ethernet Link to connect the internal end station (e.g., processing unit 510) and the bridge management layer (e.g., processing unit 512), the link between the two is achieved using an internal DMA channel.

It is also noted that when the bridge and the end station are implemented in separate devices, and communicating over the physical Ethernet Link, point-to-point control frames may be forwarded between the end station and the bridge management without use of an endpoint packet switching module. Further, in various embodiments, the endpoint packet switching module 530 allows the integrated bridge/end station device (e.g., such as the TSN bridge 502 integrated with the internal end station (processing unit 510) on the IC 500) to build the LLDP MIB and get discovered as a bridge (e.g., having three ports) with one port connected to an end station. Additionally, in some cases, point-to-point control frames that are endpoint packet switched (e.g., by the endpoint packet switching module 530) may be dropped in the TSN bridge 502 and do not get forwarded to network ports. As a result, in some embodiments, a four-port TSN bridge having one port mapped to the bridge management layer may be implemented as an alternative to using the endpoint packet switching module 530. However, in a four-port TSN bridge, each egress port needs to multiplex frames from three ingress ports and their associated priority queues, resulting in significantly higher resource utilization (e.g., FPGA resource utilization). On the other hand, in a three-port TSN bridge, each egress port needs to multiplex traffic from only two ingress ports and their associated priority queues. As such, the cost of implementing a four-port TSN bridge is significantly higher than that of a three-port TSN bridge.

In some embodiments, the multi-channel DMA 528 may provide an interface to multiple CPU cores, where the multiple CPU cores may implement independent operating systems. In various examples, the use of multiple CPU cores such as one CPU core for internal end station functions (e.g., such as layer-2 LLDP, and layer-3 and above end station applications) and another CPU core for bridge management layer functions (e.g., such as layer-2 PTP, STP, LLDP, and layer-3 and above functions such as SNMP server connections) provides for maximizing system flexibility by providing complete partitioning between the bridge management layer functions and the internal end station functions. If needed, and in some embodiments, both of the bridge management layer functions and the internal end station functions may be implemented within a single CPU core (e.g., on a single operating system).

Figure 6:
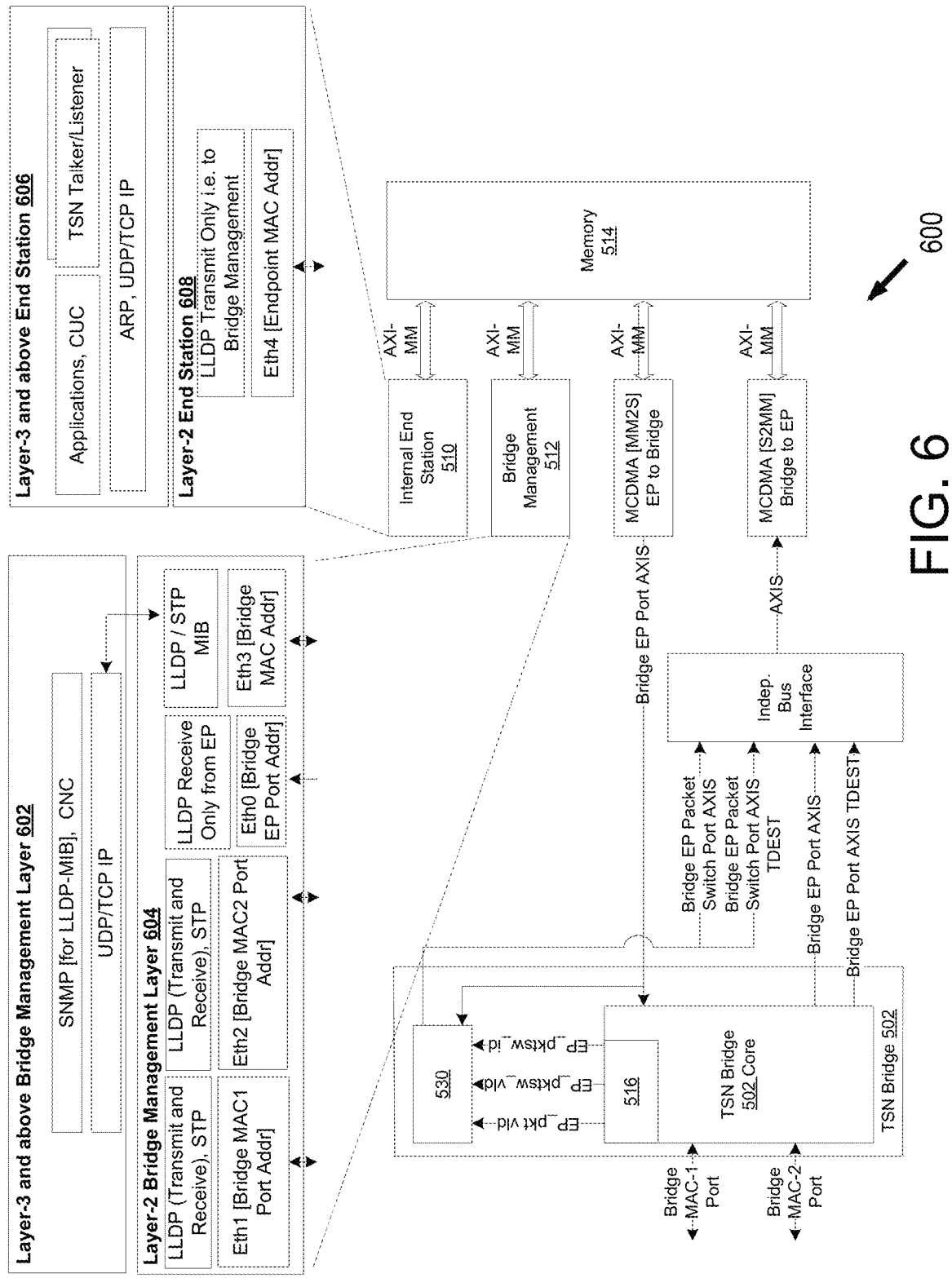
FIG. 6 provides a data flow diagram illustrating end station packet switching operations for a system including an integrated bridge/end station device, in accordance with some embodiments.

Referring now to FIG. 6, shown therein is a data flow diagram 600 illustrating end station packet switching operations for a system including an integrated bridge/end station device (e.g., such as the TSN bridge 502 integrated with the internal end station (processing unit 510) on the IC 500). As shown, the internal end station 510 and the bridge management 512 are coupled to the memory 514 through an AXI memory mapped bus (AXI-MM), where AXI is part of ARM Advanced Microcontroller Bus Architecture (AMBA), a family of micro controller buses. Further, the internal end station 510 and the bridge management 512 are coupled to the TSN bridge 502 by way of the AXI-MM and the multichannel DMA 528 (MCDMA). In various embodiments, the MCDMA 528 is utilized to communicate between the processing unit 512 (implementing the Bridge Management Layer) and the processing unit 510 (implementing the internal end station). In some embodiments, the processing unit 510 (implementing the internal end station) may also interface to external non-TSN components, for example, over PCIe, USB, CAN,)(ADC, or other type of interface. As such, this provides a very flexible TSN end station solution.

Still referring to FIG. 6, the bridge management 512 includes a layer-3 and above bridge management layer 602 and a layer-2 bridge management layer 604. The layer-3 and above bridge management layer 602 includes an SNMP interface (e.g., for LLDP MIB), a CNC interface (e.g., for management of the TSN bridge 502), and a UDP/TCP IP interface. The UDP/TCPIP interface implements UDP/TCPIP protocols and allows communication between the layer-3 and above bridge management layer 602 and the layer-2 bridge management layer 604.

The layer-2 bridge management layer 604 may include network interfaces for managing point-to-point control frames. For example, a network interface 'Eth0' (corresponding to the bridge endpoint port 504 address) may receive a point-to-point layer-2 control frame (LLDP) from the internal end station 510 on a first DMA channel (e.g., Channel-1), a network interface 'Eth1' (corresponding to the TSN bridge 502 MAC1 port address) may send or receive a layer-2 point-to-point control frame (LLDP, STP, PTP) to or from the bridge MAC1 port on a second DMA channel (e.g., Channel-2), a network interface 'Eth2' (corresponding to the TSN bridge 502 MAC2 port address) may send or receive a layer-2 point-to-point control frame (LLDP, STP, PTP) to or from the bridge MAC2 port on a third DMA channel (e.g., Channel-3), and a network interface 'Eth3' (corresponding to the TSN bridge 502 MAC address) may send or receive layer-3 and above control frames to or from the bridge 502 (e.g., using SNMP) on a fourth DMA channel (e.g., Channel-4).

The internal end station 510 includes a layer-3 and above end station portion 606 and a layer-2 end station portion 608. The layer-3 and above end station portion 606 includes applications, a CUC interface (e.g., for end station management), TSN talkers/listeners, and a ARP, UDP/TCP IP interface. The ARP, UDP/TCPIP interface allows for communication between the layer-3 and above end station portion 606 and the layer-2 end station portion 608.

The layer-2 end station portion 608 may include a network interface 'Eth4' (corresponding to an endpoint/end station MAC address). In some embodiments, the layer-2 end station portion 608 network interface 'Eth4' may send or receive application data (for highest priority scheduled queue) to or from the bridge MAC1 port and/or the bridge MAC2 port on a fifth DMA channel (e.g., Channel-5). Further, the layer-2 end station portion 608 network interface 'Eth4' may send or receive application data (for second highest priority reserved queue) to or from the bridge MAC1 port and/or the bridge MAC2 port on a sixth DMA channel (e.g., Channel-6). Also, the layer-2 end station portion 608 network interface 'Eth4' may send or receive application data (for lowest priority best effort queue), and layer-3 and above control frames, to or from the bridge MAC1 port and/or the bridge MAC2 port on a seventh DMA channel (e.g., Channel-7). In some cases, the seventh DMA channel may also be used to send point-to-point control frames (LLDP) to the bridge management 512.

In some embodiments, the IEEE defined layer-2 point-to-point control frames such as LLDP, Pause, STP have a predefined multicast MAC address as the destination MAC address within the Ethernet frame. Since these layer-2 control frames are not forwarded, but constrained to a single point-to-point link, a frame received from a network port (e.g., such as network ports 506 and 508) or from the internal end station (e.g., processing unit 510) needs to be forwarded only to the bridge management layer (e.g., processing unit 512). In various embodiments, these frames that are forwarded to the bridge management layer include ingress port information within their associated frame descriptors and provided by DMA (e.g., on a respective DMA channel). By knowing the ingress port of the received control frames, the bridge management layer (e.g., processing unit 512) may associate the control information with the per port control functions (e.g., such as updating LLDP MIB with neighbor information).

In some examples, the layer-2 point-to-point control frames such as LLDP, Pause, STP may also include a bridge port MAC address (e.g., such as a MAC address of one of the ports 504, 506, 508) as the source MAC address within the Ethernet frame. In some embodiments, the Ethernet frames generated by the bridge management layer (e.g., processing unit 512) include a bridge port MAC address as the source MAC address in the Ethernet frame. By way of example, the bridge management layer may use the source MAC address to forward the frame to the associated egress port. In some cases, the frame lookup unit 516 may compare both the predefined multicast destination MAC address and the source MAC address to determine the forwarding decisions associated with the layer-2 point-to-point control frames.

In some embodiments, and because the end station (e.g., processing unit 510) is internal, a point-to-point control frame received from the internal end station may thus be switched back internally to the bridge management layer (e.g., processing unit 512) within the IC 500. Similarly, a point-to-point control frame received from the bridge management layer (e.g., processing unit 512) may thus be switched back internally to the internal end station (e.g., processing unit 510) within the IC 500. In various embodiments, such a loopback operation (e.g., from internal end station to bridge management layer and vice-versa) may be achieved using the endpoint packet switching module 530. It is noted that it may be considered a violation for an Ethernet bridge (e.g., such as the TSN bridge 502) to forward a frame received from a particular port back to that same particular port. In various examples, the endpoint packet switching module 530 may thus be used to avoid such violations. In some cases, the endpoint packet switching module 530 is used as a common endpoint packet switching module for frames across all priority queues, which reduces cost (e.g., logic element costs).

By way of example, the endpoint packet switching module 530 may snoop frames received from a bridge/end station interface (e.g., such as an internal endpoint receiver (RX) interface 532 or an internal endpoint transmitter (TX) interface 534). The endpoint packet switching module 530 may then wait for signaling to be received from the frame lookup unit 516. In some embodiments, the endpoint packet switching module 530 receives a signal from the frame lookup unit 516 indicating that a snooped frame is not required to be looped back. In such a case, the endpoint packet switching module 530 drops that particular snooped frame.

In some examples, the endpoint packet switching module 530 receives a signal from the frame lookup unit 516 indicating that a snooped frame needs to be switched back to the internal end station or the bridge management layer. In such a case, the endpoint packet switching module 530 performs a loopback operation for the snooped frame to provide a looped-back frame of the snooped frame. The endpoint packet switching module 530 may send the looped-back frame to an independent bus interface (e.g., such as an AXI stream interface). The independent bus interface may allow a packet switched frame (e.g., the looped-back frame) to be mapped to the associated channel of the multichannel DMA 528, and send that packet switched frame to the destination using that associated channel. In an example, TDEST signaling (destination signaling, for automatic routing through AXI Stream Interconnects) on the AXI Stream interface allows the packet switched frame (e.g., the looped-back frame) to be mapped to the associated channel of the multichannel DMA 528. In some embodiments, the memory 514 (which may include a shared DRAM) can be partitioned for each unique TDEST. In some embodiments, the multichannel DMA 528 utilizes an interrupt mechanism to notify a CPU (e.g., processing unit 510 or 512) when one or more frames are written to a partition (of the memory 514) or similarly the CPU may provide an interrupt to the multichannel DMA 528 when one or more frames needs to be read from the associated partition (of the memory 514).

In an example, the endpoint packet switching module 530 may also perform the packet switching function with a bridge MAC address or an end station MAC address. For instance, an end station generated frame having a bridge MAC address as the frame destination MAC address may be packet switched and sent to the bridge management layer (e.g., processing unit 512). In such an example, however, the end station generated frame may be forwarded as a management data frame instead of a management control frame (e.g., for layer-3 and above processing).

IEEE standards define that the LLDP protocol allows for transmit Only, Receive Only or both Transmit and Receive operations. In the example of FIG. 6, the End Station (the internal end station) is configured for LLDP Transmit Only operations (to the bridge management layer) via the 'Eth4' network interface, and the Bridge End Station Port (the port 504) is configured for LLDP receive only operations via the 'Eth0' network interface. Both Bridge MAC ports (Bridge MAC1 Port and Bridge MAC2 Port) are configured for Transmit and Receive LLDP operations via the 'Eth1' and 'Eth2' network interfaces. In the present example, only the Bridge (the TSN bridge 502) is allowed to build and maintain LLDP MIB information (e.g., via the 'Eth3' network interface). However, LLDP MIB information in the Bridge also provides information about the internal End Station. This particular usage is helpful, for example, when there is only one CPU core implementing both Bridge Management Layer and End Station functions. In such a case, the Bridge MAC Address and the End Station MAC Address are shared. Alternatively, when independent CPU cores and their associated operating systems are used, the End Station and the Bridge can have independent MAC addresses and can also have LLDP to be configured in 'Transmit and Receive' mode. In such an example, the End Station can also store LLDP MIB information. In addition, the CUC 404 may communicate with the End Station using the End Station MAC Address and the CNC 402 may communicate with the Bridge using the Bridge MAC address.

Figure 7:
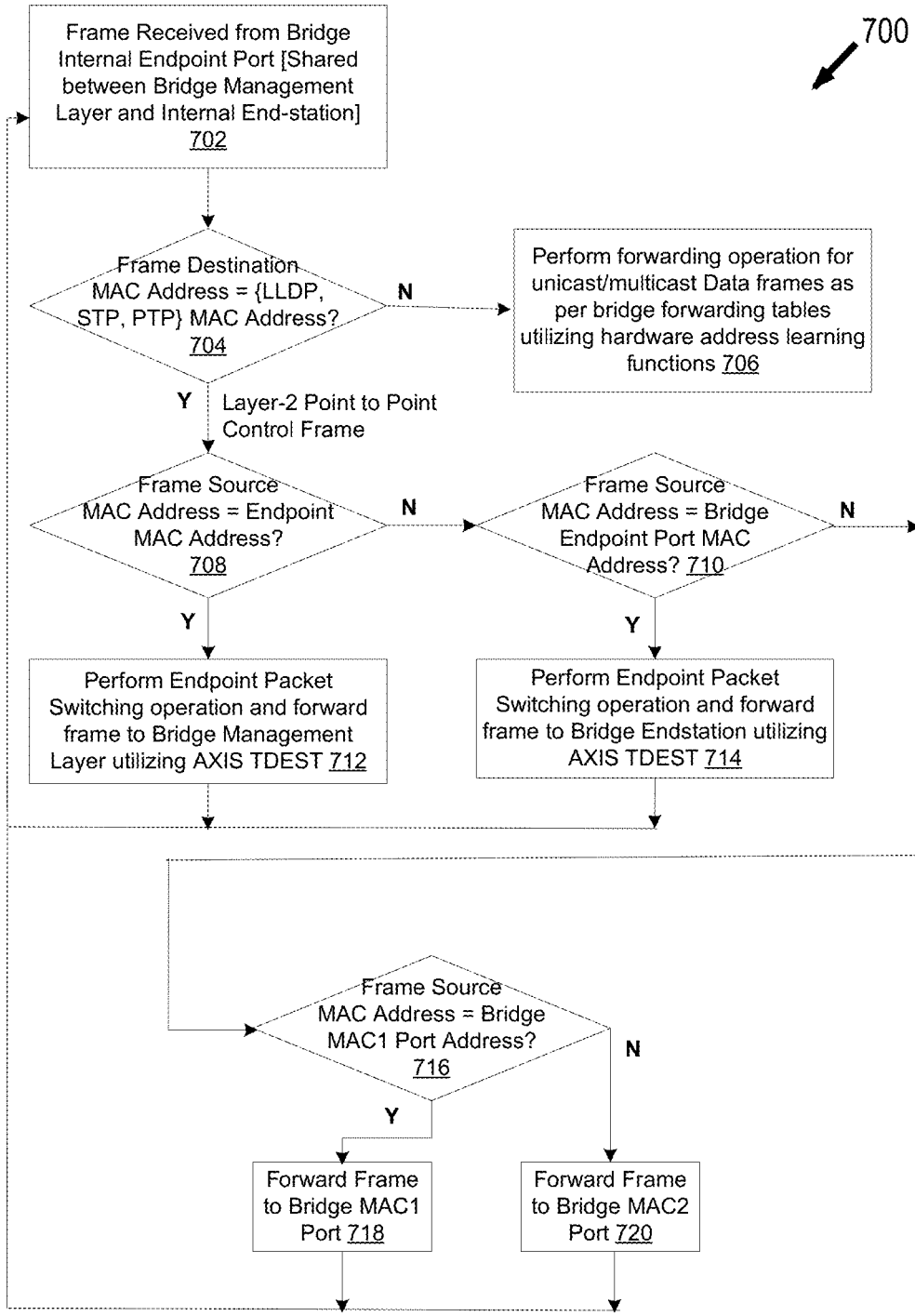
FIG. 7 is a flow diagram illustrating a method for endpoint packet switching, in accordance with some embodiments.
Figure 8:
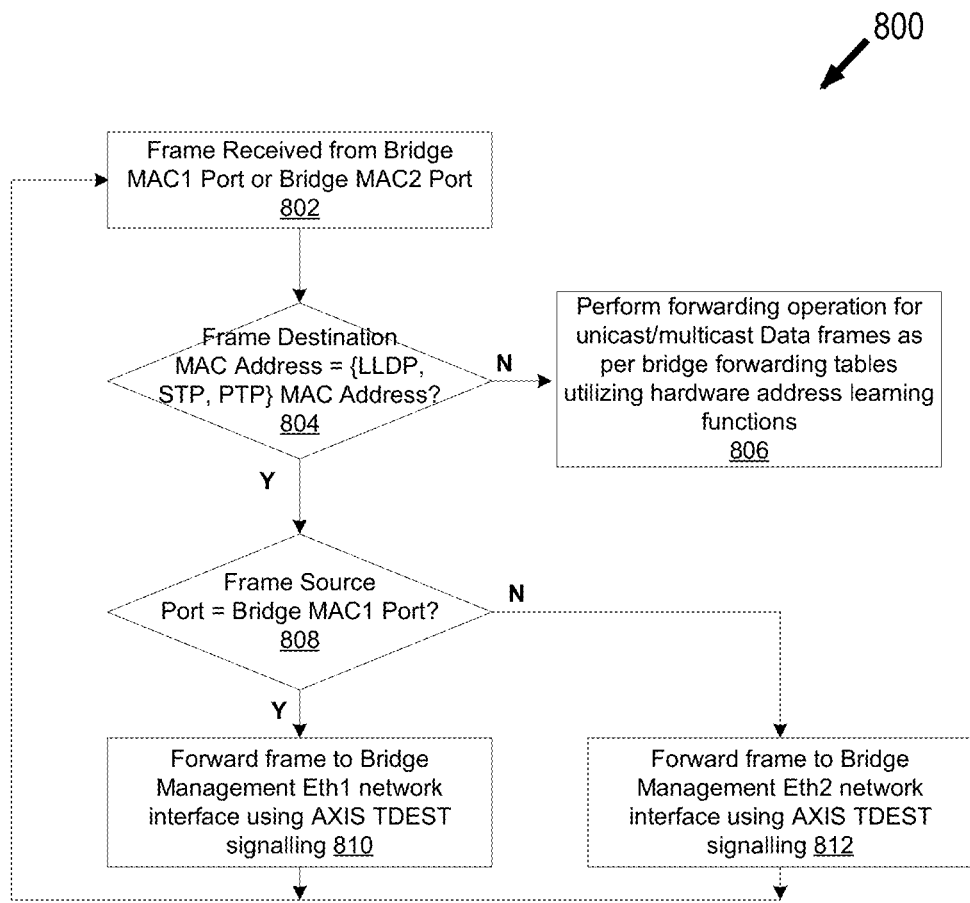
FIG. 8 is a flow diagram illustrating a network interface method, according to some embodiments.

In view of the above discussion, reference is now made to the example of FIGS. 7 and 8, which illustrate methods 700 and 800 for discovery and management of a network device including an integrated bridge and end station, according to various embodiments. It is understood that additional operations can be provided before, during, and after the methods 700 and 800, and some operations described can be replaced, eliminated, or moved around for additional embodiments of the methods. It is also noted that the methods 700 and 800 are exemplary and are not intended to limit the present disclosure beyond what is explicitly recited in the claims that follow.

Referring first to FIG. 7, the method 700 provides a method for endpoint packet switching, in accordance with some embodiments. Thus, at least some aspects of the method 700 may be performed by the endpoint packet switching module 530. The method 700 begins at block 702 where a frame is received from the internal endpoint port 504 of the TSN bridge 502. By way of example, the received frame may include a point-to-point control frame. In various embodiments, and as noted above, the internal endpoint port 504 is shared between the bridge management layer 512 (e.g., processing unit 512) and the internal end station (e.g., processing unit 510). In some embodiments, the method 700 proceeds to block 704 where it is determined whether a destination MAC address of the received frame includes a supported layer-2 protocol MAC address. For instance, it may be determined whether the destination MAC address of the received frame includes an LLDP MAC address, an STP MAC address, or a PTP MAC address. If it is determined (at block 704) that the received frame does not include a supported layer-2 protocol MAC address, then the method 700 proceeds to block 706, where a forwarding operation is performed. In particular, at block 706, the method 700 may perform a forwarding operation for unicast/multicast data frames, for example, as per bridge forwarding tables utilizing hardware address learning functions.

Alternatively, if it is determined (at block 704) that the received frame does include a supported layer-2 protocol MAC address, then the method 700 proceeds to block 708, where it is determined whether the source MAC address of the received frame is equal to an endpoint MAC address (e.g., an end station MAC address). If it is determined (at block 708) that the source MAC address of the received frame is equal to an endpoint MAC address (e.g., the end station MAC address), then the method 700 proceeds to block 712, where an endpoint packet switching operation is performed (e.g., by the endpoint packet switching module 530). In particular, at block 712, the method 700 may perform the endpoint packet switching operation and forward the received frame to the bridge management layer (e.g., processing unit 512) utilizing TDEST signaling. As previously noted, TDEST signaling provides destination signaling for automatic routing through AXI Stream Interconnects. After block 712, the method 700 may proceed to block 702 where a subsequent frame is received from the internal endpoint port 504 of the TSN bridge 502.

If it is determined (at block 708) that the source MAC address of the received frame is not equal to an endpoint MAC address (e.g., an end station MAC address), then the method 700 proceeds to block 710, where it is determined whether the source MAC address of the received frame is equal to a bridge endpoint port MAC address. If it is determined (at block 710) that the source MAC address of the received frame is equal to a bridge endpoint port MAC address, then the method 700 proceeds to block 714, where an endpoint packet switching operation is performed (e.g., by the endpoint packet switching module 530). In particular, at block 714, the method 700 may perform the endpoint packet switching operation and forward the received frame to the bridge end station utilizing TDEST signaling. After block 714, the method 700 may proceed to block 702 where a subsequent frame is received from the internal endpoint port 504 of the TSN bridge 502.

If it is determined (at block 710) that the source MAC address of the received frame is not equal to a bridge endpoint port MAC address, then the method 700 proceeds to block 716, where it is determined whether the source MAC address of the received frame is equal to a bridge MAC1 port address. If it is determined (at block 716) that the source MAC address of the received frame is equal to a bridge MAC1 port address, then the method 700 proceeds to block 718, where the received frame is forwarded to the bridge MAC1 port. If it is determined (at block 716) that the source MAC address of the received frame is not equal to a bridge MAC1 port address, then it is determined that the source MAC address of the received frame is instead equal to a bridge MAC2 port address and thus the method 700 proceeds to block 720, where the received frame is forwarded to the bridge MAC2 port. After either of block 718 or block 720, the method 700 may proceed to block 702 where a subsequent frame is received from the internal endpoint port 504 of the TSN bridge 502.

Elaborating on aspects of the method 700, point-to-point Control Frames generated by the bridge management layer (e.g., processing unit 512) may include a bridge port address as the source MAC address of the frame. In some embodiments, the egress port in such an example may be identified using the source MAC address in the frame. Frames received having the source MAC Address as ETH0 (FIG. 6) are forwarded to the internal end station using TDEST signaling. In some examples, frames received having the source MAC Address as ETH1 (FIG. 6) are forwarded to the Bridge MAC-1 Port and frames received having the source MAC Address as ETH2 (FIG. 6) are forwarded to the Bridge MAC-2 Port. In some examples, point-to-point Control Frames received from the internal end station (e.g., from the source MAC Address ETH4) on the bridge endpoint port are forwarded to ETH0 using TDEST signaling.

Referring now to FIG. 8, the method 800 provides a network interface method, in accordance with some embodiments. The method 800 begins at block 802 where a frame is received from the bridge MAC-1 port or the bridge MAC-2 port (e.g., as shown in FIGS. 5 and 6). By way of example, the received frame may include a point-to-point control frame. In some embodiments, the method 800 proceeds to block 804 where it is determined whether a destination MAC address of the received frame includes a supported layer-2 protocol MAC address. For instance, it may be determined whether the destination MAC address of the received frame includes an LLDP MAC address, an STP MAC address, or a PTP MAC address. If it is determined (at block 804) that the received frame does not include a supported layer-2 protocol MAC address, then the method 800 proceeds to block 806, where a forwarding operation is performed. In particular, at block 806, the method 800 may perform a forwarding operation for unicast/multicast data frames, for example, as per bridge forwarding tables utilizing hardware address learning functions.

If it is determined (at block 804) that the received frame does include a supported layer-2 protocol MAC address, then the method 800 proceeds to block 808, where it is determined whether the source port of the received frame is equal to the bridge MAC-1 port. If it is determined (at block 808) that the source port of the received frame is equal to the bridge MAC-1 port, then the method 800 proceeds to block 810, where the frame is forwarded to the bridge management Eth1 network interface utilizing TDEST signaling. After block 810, the method 800 may proceed to block 802 where a subsequent frame is received from the bridge MAC-1 port or the bridge MAC-2 port.

Alternatively, if it is determined (at block 808) that the source port of the received frame is not equal to the bridge MAC-1 port, then it is determined that the source port of the received frame is instead equal to the bridge MAC-2 port and thus the method 800 proceeds to block 812, where the frame is forwarded to the bridge management Eth2 network interface utilizing TDEST signaling. After block 812, the method 800 may proceed to block 802 where a subsequent frame is received from the bridge MAC-1 port or the bridge MAC-2 port.

Providing further details regarding the method 800, point-to-point control frames received from the bridge input port(s) are forwarded only to the bridge management layer (e.g., processing unit 512). In some embodiments, frames received from the bridge MAC-1 Physical Port are forwarded to the bridge management Eth1 network interface, frames received from the bridge MAC-2 Physical Port are forwarded to the bridge management Eth2 network interface, and frames received from the internal end station (e.g., processing unit 510) on the bridge endpoint port are forwarded to the bridge management Eth0 network interface.

The systems and methods discussed herein provide an integrated bridge and end station (e.g., utilizing an FPGA fabric and embedded processors) while also enabling each of the bridge and end station to be independently discovered and managed in an Ethernet network (e.g., using LLDP and SNMP). In various embodiments, the integrated TSN bridge and end station solution can provide complete end-to-end redundancy for critical traffic in Time Sensitive Networks. In addition, as the integrated bridge and end station disclosed herein may be implemented in an FPGA (such as the FPGA 100), the integrated bridge/end station has ready access to other FPGA integrated components such as DACs, real-time processor(s), flexible 10s, as well as other components, which may further assist to implement time-aware end station functionality. As such, the integrated bridge/end station solution implemented within an FPGA thus maximizes the cost benefits and also adds to the robustness of the integrated bridge/end station solution. The integrated bridge/end station solution also needs to be flexible to support discovery and management in Ethernet networks. As disclosed herein, embodiments of the present disclosure provide methods to achieve this flexibility (enabling discovery and management in Ethernet networks) and provide a significant value addition to the integrated bridge and end station solution.

It is noted that various configurations (e.g., the number of ports of the TSN bridge, frame priorities, etc.) illustrated in the figures are exemplary only and are not intended to be limiting beyond what is specifically recited in the claims that follow. For instance, while an additional DMA channel is described as establishing an independent communication path between the internal end station (e.g., processing unit 510) and the bridge management layer (e.g., processing unit 512), as an alternative approach an interprocessor communication (IPC) interface may be used to communicate between the internal end station and the bridge management layer. By way of example, an IPC interface provides for moving data between loosely coupled processors (e.g., processing units 510 and 512) using a multi-processor interconnect facility (MPIF) and channel-to-channel (CTC) communication links.

In some embodiments, the additional DMA channel may be referred to as a first internal channel, and the IPC interface may be referred to as a second internal channel. In at least some embodiments, the communication path between the internal end station (e.g., processing unit 510) and the bridge management layer (e.g., processing unit 512) may be implemented using the first internal channel, the second internal channel, or a combination thereof. It is further noted that embodiments of the present disclosure provide a completely transparent solution which is independent of operating systems (e.g., of operating systems used in the processing units 510 and 512). Also, since the disclosed embodiments establish a hardware channel (e.g., DMA channel) similar to a physical link between an end station and a bridge end station port, the software and hardware function can maintain compatibility for example per port frame statistics information and also allows for hardware/software enhancement to support other layer-2 control protocols such as PTP or PFC and layer-3 and above control protocols. It will be understood by those skilled in that art in possession of this disclosure that other circuit structures, configurations, and/or methods may also be used.

One or more elements in embodiments of the invention may be implemented by software, hardware (e.g., an application specific integrated circuit (ASIC), a logic on a programmable logic IC (e.g., FPGA)), firmware, and/or a combination thereof. The embodiments may be implemented using various hardware resources, such as for example DSP slices, BRAM, and programmable resources of an FPGA; however, in other embodiments, digital signal processors, microprocessors, multi-core processors, memory, and/or other hardware may be used. In some examples, for FPGA implementations, the bridge 502 may be implemented as logic in FPGA fabric, and an embedded processor and memory may provide the necessary system software. In those examples, integrated components (e.g., ADC, DAC) in an FPGA IC may further assist the various functions including for example management and discovery of the integrated bridge/end station solution. For TSN solutions, the embodiments described herein improve significantly the cost benefits associated with the integration of TSN components.

When implemented in software, the elements of the embodiments of the invention are essentially the code segments to perform the necessary tasks. The program or code segments can be stored in a processor-readable storage medium or device that may have been downloaded by way of a computer data signal embodied in a carrier wave over a transmission medium or a communication link. The processor readable storage device may include any medium that can store information including an optical medium, semiconductor medium, and magnetic medium. Processor readable storage device examples include an electronic circuit; a semiconductor device, a semiconductor memory device, a read-only memory (ROM), a flash memory, an erasable programmable read-only memory (EPROM); a floppy diskette, a CD-ROM, an optical disk, a hard disk, or other storage device. The code segments may be downloaded via computer networks such as the Internet, Intranet, etc.

Although particular embodiments have been shown and described, it will be understood that it is not intended to limit the claimed inventions to the preferred embodiments, and it will be obvious to those skilled in the art that various changes and modifications may be made without departing from the spirit and scope of the claimed inventions. The specification and drawings are, accordingly, to be regarded in an illustrative rather than restrictive sense. The claimed inventions are intended to cover alternatives, modifications, and equivalents.

What is claimed is:

1. An integrated circuit (IC) device, comprising:
   a bridge device including an endpoint packet switching module, a frame replication and elimination for reliability (FRER) unit, a first network port, a second network port, and an internal endpoint port, wherein the first and second network ports connect the bridge device to a time-sensitive networking (TSN) network external to the IC device, and wherein the internal endpoint port connects the bridge device to a plurality of processing units within the IC device;
   a first processing unit of the plurality of processing units, wherein the first processing unit includes an internal end station device that communicates with the bridge device using the internal endpoint port; and
   a second processing unit of the plurality of processing units, wherein the second processing unit includes a bridge management device that communicates with the bridge device using the internal endpoint port;
   wherein the first processing unit and the second processing unit communicate with each other using a multichannel direct memory access (DMA) within the IC device; and
   wherein the endpoint packet switching module snoops a point-to-point (PTP) control frame received at the internal endpoint port of the bridge device to determine a source MAC address of the snooped PTP control frame and performs a loopback operation, wherein the loopback operation performs a switch back of the PTP control frame from the internal end station device to the bridge management device and vice-versa, based on the determined source MAC address of the snooped PTP control frame.

2. The IC device of claim 1, wherein the FRER unit replicates an Ethernet frame within the bridge device to provide a plurality of instances of the Ethernet frame for transmission to the TSN network external to the IC device and provide redundancy between the bridge device and the internal end station device.

3. The IC device of claim 1, wherein the internal end station device or the bridge management device independently transmits data to or receives data from the TSN network via the first network port or the second network port.

4. The IC device of claim 1, wherein the endpoint packet switching module utilizes the multichannel DMA to create an additional DMA channel.

5. The IC device of claim 4, wherein the additional DMA channel provides an independent communication path between the internal end station device and the bridge management device.

6. The IC device of claim 1, wherein the bridge management device builds and maintains a link layer discovery protocol (LLDP) management information base (MIB).

7. The IC device of claim 6, wherein the bridge management device includes a simple network management protocol (SNMP) interface that is utilized to build and maintain the LLDP MIB.

8. The IC device of claim 1, wherein the bridge management device includes a plurality of network interfaces for managing point-to-point (PTP) control frames.

9. The IC device of claim 8, wherein a network interface of the plurality of network interfaces of the bridge management device receives a PTP control frame from the internal end station device on a first DMA channel.

10. The IC device of claim 1, wherein the internal end station device includes a network interface for managing PTP control frames, and wherein the network interface of the internal end station device sends a PTP control frame to the bridge management device.

11. A method of operating an integrated circuit (IC) device including a bridge device, comprising:
    connecting the bridge device to a time-sensitive networking (TSN) network external to the IC device using a first network port and a second network port of the bridge device, wherein the bridge device includes an endpoint packet switching module, a frame replication and elimination for reliability (FRER) unit, and an internal endpoint port;
    connecting, by the internal endpoint port, the bridge device to a plurality of processing units within the IC device;
    communicating, by an internal end station device of a first processing unit of the plurality of processing units, with the bridge device using the internal endpoint port;
    communicating, by a bridge management device of a second processing unit of the plurality of processing units, with the bridge device using the internal endpoint port;
    communicating, using a multichannel direct memory access (DMA) within the IC device, between the first processing unit and the second processing unit; and
    snooping, using the endpoint packet switching module, a point-to-point (PTP) control frame received at the internal endpoint port of the bridge device to determine a source MAC address of the snooped PTP control frame and performs a loopback operation, wherein the loopback operation performs a switch back of the PTP control frame from the internal end station device to the bridge management device and vice-versa, based on the determined source MAC address of the snooped PTP control frame.

12. The method of claim 11, further comprising replicating, using the FRER unit, an Ethernet frame within the bridge device to provide a plurality of instances of the Ethernet frame for transmission to the TSN network external to the IC device and provide redundancy between the bridge device and the internal end station.

13. The method of claim 11, further comprising independently transmitting data to or receiving data from the TSN network using the internal end station device or the bridge management device via the first network port or the second network port.

14. The method of claim 11, further comprising creating, by the endpoint packet switching module, an additional DMA channel using the multichannel DMA.

15. The method of claim 14, wherein the additional DMA channel provides an independent communication path between the internal end station device and the bridge management device.

16. The method of claim 11, further comprising building and maintaining, using the bridge management device, a link layer discovery protocol (LLDP) management information base (MIB).

17. The method of claim 16, wherein the bridge management device includes a simple network management protocol (SNMP) interface that is utilized for the building and maintaining the LLDP MIB.

18. The method of claim 11, further comprising managing, by a plurality of network interfaces of the bridge management device, point-to-point (PTP) control frames.

19. The method of claim 18, further comprising receiving, by a network interface of the plurality of network interfaces of the bridge management device, a PTP control frame from the internal end station device on a first DMA channel.

20. The method of claim 11, further comprising sending, by a network interface of the internal end station, a PTP control frame to the bridge management device.

* * * * *